United States Patent
Berkness et al.

(10) Patent No.: US 10,086,660 B1
(45) Date of Patent: *Oct. 2, 2018

(54) TIRE PRESSURE MANAGEMENT SYSTEM

(71) Applicant: Airgo IP, LLC, Oklahoma City, OK (US)

(72) Inventors: Phillip K. Berkness, Savage, MN (US); Kyle J. Berkness, Savage, MN (US); Daniel P. Dooley, Oklahoma City, OK (US)

(73) Assignee: Airgo IP, LLC, Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/087,458

(22) Filed: Mar. 31, 2016

(51) Int. Cl.
*B60C 23/00* (2006.01)

(52) U.S. Cl.
CPC .................. *B60C 23/003* (2013.01)

(58) Field of Classification Search
CPC .................. B60C 23/003; B60C 29/068
USPC .......................................... 152/417
See application file for complete search history.

(56) References Cited

U.S. PATENT DOCUMENTS

| | | |
|---|---|---|
| 1,072,907 A | 9/1913 | Brooks |
| 1,083,847 A | 1/1914 | McDowell et al. |
| 1,165,057 A | 12/1915 | Bayly |
| 1,205,504 A | 11/1916 | Bearce |
| 1,827,662 A | 10/1931 | Maas |
| 2,156,841 A | 5/1939 | Davis |
| 2,177,042 A | 10/1939 | Michael |
| 2,242,207 A | 5/1941 | Bowers |
| 2,657,731 A | 11/1953 | Gozzoli |
| 2,849,047 A | 8/1958 | Lamont et al. |
| 2,976,606 A | 3/1961 | Huet |
| 3,276,503 A | 10/1966 | Kilmarx |
| 3,367,722 A | 2/1968 | Miyanaga |
| 3,705,614 A | 12/1972 | Juttner et al. |
| 3,838,717 A | 10/1974 | Wolf |
| 4,154,279 A | 5/1979 | Tsuruta |
| 4,387,931 A | 6/1983 | Bland |
| 4,582,107 A | 4/1986 | Scully |
| 4,641,698 A | 2/1987 | Bitonti |
| 4,685,501 A | 8/1987 | Williams |
| 4,805,681 A | 2/1989 | Vollmer et al. |
| 4,844,138 A | 7/1989 | Kokubu |

(Continued)

FOREIGN PATENT DOCUMENTS

DE     202015105702 U1 *  1/2017  ........... B60C 23/003

*Primary Examiner* — Kip T Kotter
(74) *Attorney, Agent, or Firm* — Hall Estill Attorneys at Law (57) ABSTRACT

A tire pressure management system includes at least an axle enclosing a pressurized fluid, a hubcap supported by the axle and having an interior and an exterior, a rotary union axially aligned with the axle and mounted to the hubcap, the rotary union includes at least, a fluid conduit having upstream and downstream ends, a first bearing and a second bearing, the first bearing in pressing engagement with the fluid conduit and adjacent the downstream end of said fluid conduit, the second bearing in pressing engagement with the fluid conduit and adjacent the upstream end of said fluid conduit, and a first and second seal, the first seal is disposed between the first bearing and the downstream end of the fluid conduit, and the second seal is disposed between the second bearing and the upstream end of the fluid conduit.

22 Claims, 8 Drawing Sheets

(56) References Cited

U.S. PATENT DOCUMENTS

| | | |
|---|---|---|
| 4,883,106 A | 11/1989 | Schultz et al. |
| 4,924,926 A | 5/1990 | Schultz et al. |
| 5,080,156 A | 1/1992 | Bartos |
| 5,080,157 A | 1/1992 | Oerter |
| 5,174,839 A | 12/1992 | Schultz et al. |
| 5,236,028 A | 8/1993 | Goodell et al. |
| 5,287,906 A | 2/1994 | Stech |
| 5,377,736 A | 1/1995 | Stech |
| 5,398,743 A | 3/1995 | Bartos |
| 5,429,167 A | 7/1995 | Jensen |
| 5,482,358 A | 1/1996 | Kuck |
| 5,538,062 A | 7/1996 | Stech |
| 5,558,408 A | 9/1996 | Naedler et al. |
| 5,584,949 A | 12/1996 | Ingram |
| 5,735,364 A | 4/1998 | Kinoshita |
| 5,752,746 A | 5/1998 | Perry |
| 5,767,398 A | 6/1998 | Naedler |
| 5,769,979 A | 6/1998 | Naedler |
| 6,105,645 A | 8/2000 | Ingram |
| 6,145,559 A | 11/2000 | Ingram, II |
| 6,244,316 B1 * | 6/2001 | Naedler ................ B60C 23/003 152/417 |
| 6,435,238 B1 | 8/2002 | Hennig |
| 6,585,019 B1 | 7/2003 | Ingram |
| 6,968,882 B2 | 11/2005 | Ingram |
| 7,302,980 B2 | 12/2007 | Ingram |
| 7,418,989 B2 | 9/2008 | Ingram |
| 7,963,159 B2 * | 6/2011 | Ingram ................ B60C 23/003 73/146 |
| 7,992,610 B2 * | 8/2011 | Collet ................ B60C 23/003 137/522 |
| 8,505,600 B2 * | 8/2013 | Padula ................ B60C 23/003 152/415 |
| 2002/0124926 A1 * | 9/2002 | Colussi ................ B60C 23/003 152/417 |
| 2004/0155516 A1 * | 8/2004 | Colussi ................ B60C 23/003 301/5.24 |
| 2004/0187568 A1 | 9/2004 | Locatelli |
| 2005/0133134 A1 * | 6/2005 | Ingram ................ B60C 23/003 152/417 |
| 2006/0179929 A1 * | 8/2006 | Becker ................ B60C 23/003 73/146 |
| 2006/0231184 A1 * | 10/2006 | Beverly ................ B60C 23/003 152/417 |
| 2012/0024445 A1 * | 2/2012 | Wilson ................ B60C 23/003 152/415 |
| 2013/0199685 A1 * | 8/2013 | Nelson ................ B60C 29/00 152/415 |

* cited by examiner

TIRE PRESSURE MANAGEMENT SYSTEM

FIELD OF THE INVENTION

The present invention relates to the field of tire pressure maintenance. More particularly, the present invention relates to the management of tire pressure of tires supporting tractor trailers, even while the trailers are traveling along a roadway.

BACKGROUND OF THE INVENTION

The present invention relates to an improved rotary union for use in a central tire pressure management system for automatically maintaining the inflation pressure of the pneumatic tires on moving vehicles such as tractor trailers. Typically, tractor trailers utilize the air compressor on the tractor as a source of pressurized air to activate braking systems. The compressor directs air to the reserve air brake tank on the trailer, which generally corresponds to the range of typical inflation pressures in the tires used on trailers. Air from the reserve air brake tank is first directed to the braking system to maintain the air pressure in the braking system. In conventional tire inflation systems, excess air is directed from the tank through a pressure protection valve to a control box for the tire inflation system. The pressure protection valve only opens to direct the air to the control box when excess air pressure is present, thereby preventing air from being directed to the tire inflation system which is needed for the trailer braking system.

The control box contains a pressure regulator which is set to the cold tire pressure of the particular tires on the trailer so as to supply air to the tires at the desired pressure level in the event of a leak. Air is directed from the control box to the leaking tire through one of the trailer axles, which either carries an air line from the control box, or is sealed and functions as an air conduit. The pressurized air carried by the axles communicates with each pair of trailer tires mounted thereon through a rotary union assembly by which air flow is directed from a stationary air line to the valve stems on the rotating tires. Pressure responsive valves are employed between each rotary union assembly and its associated tires so that upon the occurrence of a leak in one of the tires, the resulting pressure loss will cause one of the valves to open and allow air flow from the rotary union assembly to pass therethrough to the leaking tire.

As tire inflation systems become adopted for broader uses, reliability and ease of maintenance, as well as an ability to manage under inflated as well as over inflated tires have emerged as important demands from the industry, accordingly improvements in apparatus and methods of installing tire inflation systems are needed and it is to these needs the present invention is directed.

SUMMARY OF THE INVENTION

In accordance with preferred embodiments, a tire pressure management system includes at least an axle housing enclosing a pressurized fluid, a hubcap supported by the axle and having an interior and an exterior, and a rotary union axially aligned with the axle and mounted to the hubcap from the exterior of the hubcap. Preferably, the rotary union including at least a fluid conduit, the fluid conduit having a downstream end and an upstream end, a pair of bearings, each of the pair of bearings providing an inner race and an outer race, each inner race of the pair of bearings is preferably in pressing communication with the fluid conduit, a first bearing of the pair of bearings is preferably adjacent the downstream end of said fluid conduit, and a second bearing of the pair of bearings is preferably adjacent the upstream end of the fluid conduit.

Preferably, the tire pressure management system further includes at least a pair of fluid seals, a first seal of the pair of fluid seals engage an external surface of the fluid conduit and is preferably disposed between the first bearing and the downstream end of the fluid conduit, and a second seal of the pair of fluid seals engaging the external surface of the fluid conduit and is preferably disposed between the second bearing and the upstream end of the fluid conduit.

These and various other features and advantages that characterize the claimed invention will be apparent upon reading the following detailed description and upon review of the associated drawings.

BRIEF DESCRIPTION OF THE DRAWINGS

The present invention is illustrated by way of example and not limitation in the figures of the accompanying drawings, in which like references indicate similar elements and in which.

DESCRIPTION OF PREFERRED EMBODIMENTS

It will be readily understood that elements of the present invention, as generally described and illustrated in the Figures herein, could be arranged and designed in a wide variety of different configurations. Referring now in detail to the drawings of the preferred embodiments, the rotary union assembly 10 (also referred to herein as assembly 10, and rotary union 10) of the first preferred embodiment, while useable on a wide variety of movable vehicles employing stationary axles for automatically maintaining the inflation pressure of the pneumatic tires thereon, is particularly adapted for use on tractor trailers. Throughout the remainder of this disclosure, sign numbers will be used to show the same part of an invention appearing in more than one view of the drawing shall be designated by the same reference character, and the same reference character shall not be used to designate different parts. It is noted that there are no dimensions associated within any of the drawing. As such, a particular part of the invention may have an appearance of being slightly different in form from drawing to drawing, however the function that part plays in the limitations of the invention remain the same. Accordingly, sign numbers such as ten (10), ten prime (10'), and ten double prime (10") are, from the point of view of the invention, identical and interchangeable with one another, because the function served by that part, such as 10, 10', or 10" remain the same within the invention.

Accordingly, the assembly 10 of the first preferred embodiment will be described in conjunction with a pair of adjacent vehicle tires 12 and 14 mounted on a stationary tractor trailer axle housing 16 (also referred to herein as trailer axle housing 16, and axle housing 16). While identical rotary union assemblies 10 are provided at the end of each axle on the trailer to maintain the inflation pressure of the tires carried thereby, in each: the preferred embodiment; the alternate preferred embodiment; and the alternative preferred embodiment, reference will be made to only one such assembly and the pair of tires it services.

Figure 1:
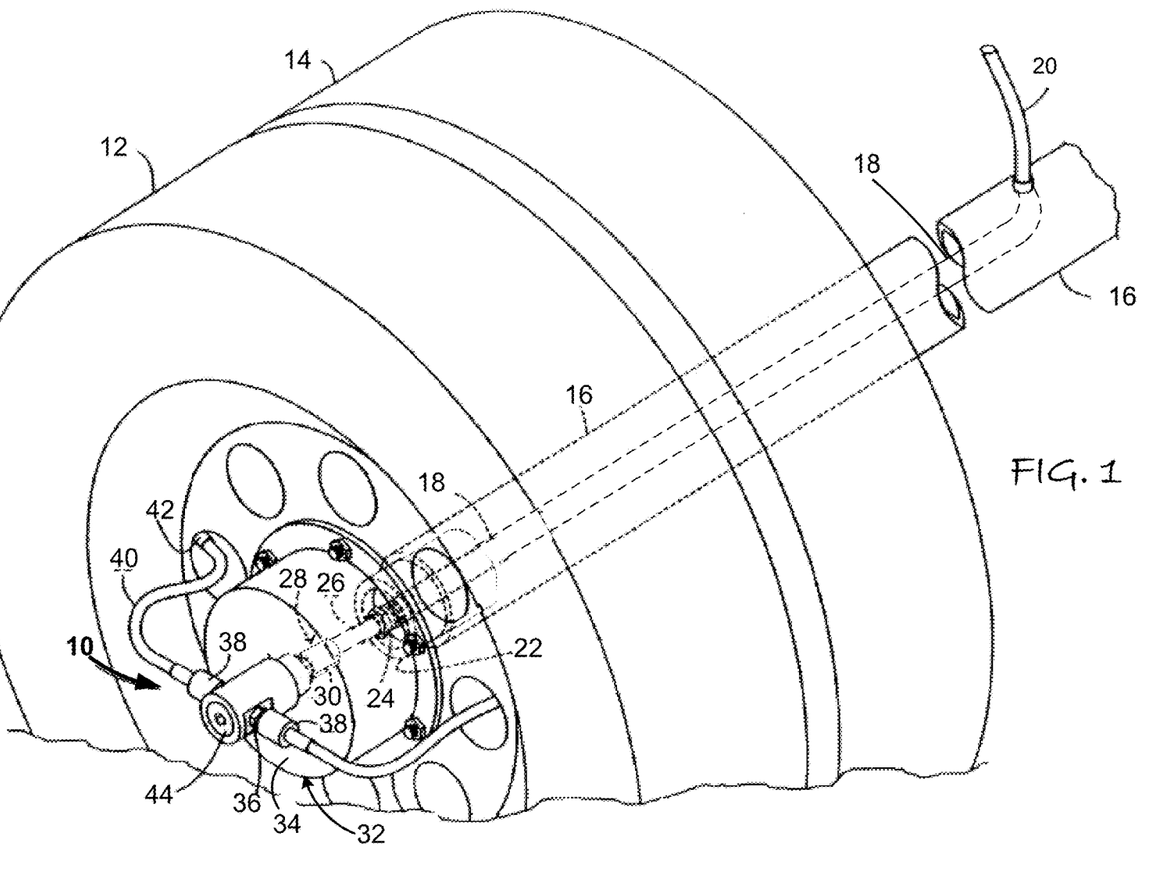
FIG. 1 is a partial perspective view of a rotary union assembly of the present novel tire pressure management system shown secured to an outer wheel of a pair of tractor trailer tires mounted on a stationary axle.

Preferably, the trailer axle housing 16 which carries tires 12 and 14 is sealed and functions as a source for pressurized fluid, else houses an air supply line 18 to supply air to the rotary union assembly 10, also referred to as 10' within this specification and in various drawings of this specification and as identified, or shown in the various drawings, rotary union assembly 10 differs from rotary union assembly 10' in esthetic presentation only; they are functional equivalents. A fluid supply line 20 preferably provides air under pressure to the interior of the axle housing 16, else to an air supply line 18, from the conventional air compressor on the tractor via a standard pressure protection valve and control box (not shown) to pressurize the axle housing 16, else to pressurize the air supply line 18, at the cold tire pressure of the trailer tires. FIG. 1 further shows that the axle housing 16 supports an axle plug 22, which in turn supports a push to connect fluid fitting 24. Preferably, the push to connect fluid fitting 24 is attached to and in fluid communication with a fill tube 26, which in a preferred embodiment is a flexible fill tube 26. As identified, or shown, in the various drawings, fill tube 26 differs from fill tube 26' by esthetic presentation only; they are functional equivalents. Preferably, the flexible fill tube 26 is connected to a fluid conduit 28, which supplies pressurized air to the rotary union assembly 10. Preferably, the flexible fill tube 26 is secured to the fluid conduit 28, by a compression fitting 30. As those skilled in the art would know, a compression fitting, or alternate mechanical means, could serve the function of the push to connect fluid fitting 24. As identified, or shown, in the various drawings, fluid conduit 28 differs from fluid conduit 28' by esthetic presentation only; they are functional equivalents.

In a preferred embodiment, the rotary union assembly 10 is mounted to a hubcap 32, from an exterior 34 of the hubcap 32, and provides pressurized air, by way of an air delivery channel 36, to tire pressure hose fittings 38 that are secured to tire pressure hoses 40. Each tire pressure hose 40 supplies the pressurized air to tire valve stems 42 of tires 12 and 14. Preferably, the rotary union assembly 10 provides a seal access aperture 39 that cooperates with a removable seal access cover 44, which mitigates escapement of pressurized fluid from the air delivery channel 36, the tire pressure hoses 40, and the tires 12 and 14.

Figures 2, 3:
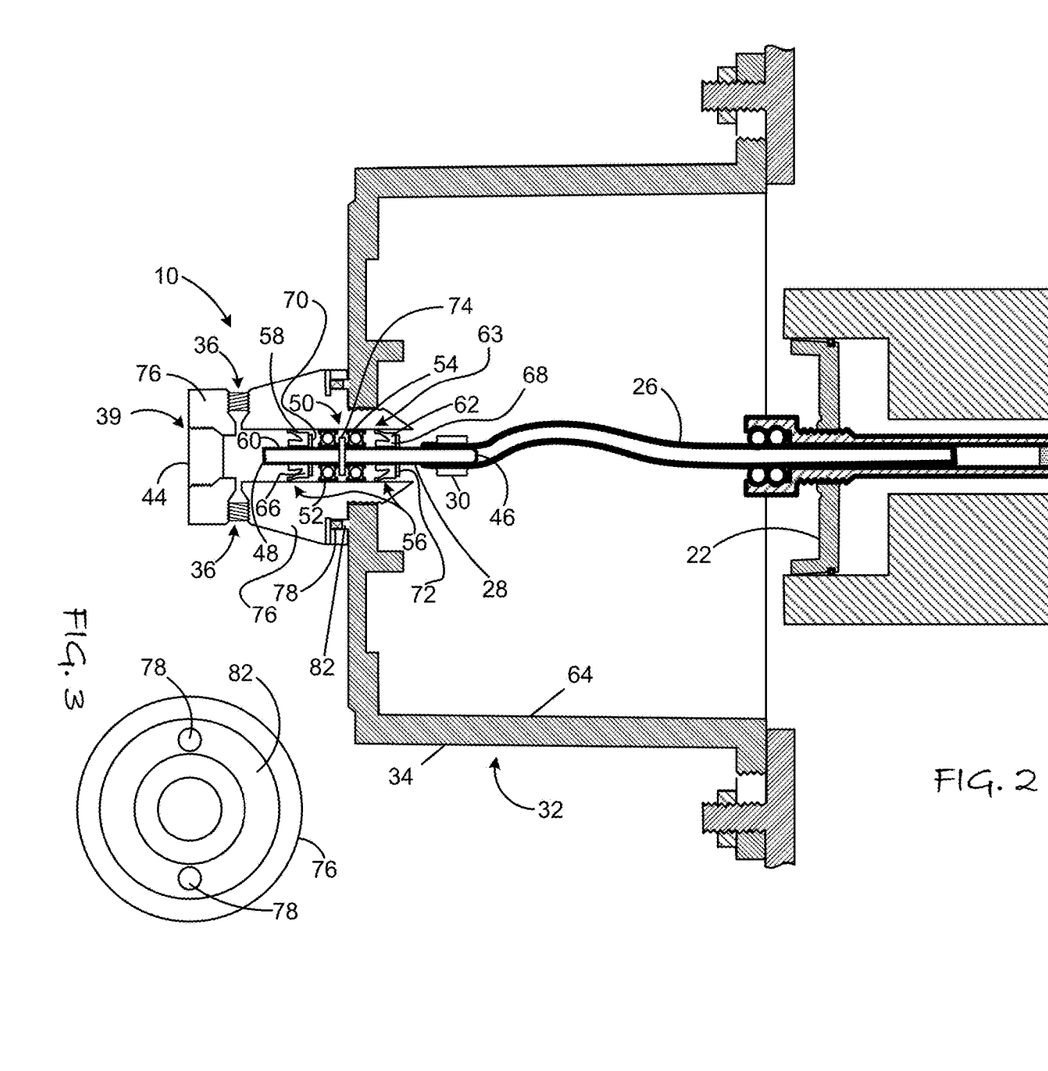
FIG. 2 is a sectional side view of the rotary union assembly of the present novel tire pressure management system and associated axle spindle.
FIG. 3 is bottom plan view of the rotary union assembly of the present novel tire pressure management system.

As seen in FIGS. 2 and 3, the fluid conduit 28 provides a downstream end 48 and an upstream end 46, and the rotary union assembly 10 further preferably includes a pair of bearings 50, in which each of the pair of bearings 50 provides an inner race and an outer race. In a preferred embodiment, a first bearing 52, of the pair of bearings 50, is adjacent the downstream end 48, of the fluid conduit 28, while the second bearing 54, of the pair of bearings 50, is adjacent the upstream end 46, of the fluid conduit 28. As identified, or shown, in the various drawings, first bearing 52 differs from first bearing 52' by esthetic presentation only; they are functional equivalents, and as identified, or shown, in the various drawings, second bearing 54 differs from second bearing 54' by esthetic presentation only; they are functional equivalents. Further, as seen in FIG. 2, the fluid conduit is a single, unitary component between the upstream end 46, and the downstream end 48.

FIG. 2 further shows that in a preferred embodiment, the rotary union assembly 10, further includes a pair of fluid seals 56, with a first fluid seal 58, is preferably disposed between the first bearing 52, and the downstream end 48 of the fluid conduit 28, while the second fluid seal 62, of the pair of fluid seals 56, is preferably disposed between the second bearing 54, and the upstream end 46, of the fluid conduit 28. In a preferred embodiment, the second fluid seal 62 mitigates transfer of an environment contained within an interior 64, of the hubcap 32, from entry into the pair of bearings 50, and wherein each first seal 58 and the second seal 62 of said pair of fluid seals 56 form a rotary seal 63 between an external surface 60, of the fluid conduit and a bore surface 86 (of FIG. 4), of a central bore 84 (of FIG. 4), of a rotary union housing 76'. As identified, or shown, in the various drawings, external surface 60 differs from external surface 60' by esthetic presentation only; they are functional equivalents. Preferably, the pair of fluid seals are lip seals 56.

FIG. 2 still further shows that in a preferred embodiment, each of the pair of fluid seals 56 (58 and 62), provide a base portion (66 and 68 respectfully), and the rotary union assembly 10, further includes: a first fluid seal restraint 70, which is disposed between the first bearing 52, and the base portion 66 of the first fluid seal 58, and in pressing engagement with the external surface 60, of the fluid conduit 28, which, as can be seen by FIG. 2, means the first seal restraint 70, is disposed between the downstream end 48 of the fluid conduit 28 and the base portion 66 of the first fluid seal 58; and a second fluid seal restraint 72, which is disposed between the base portion 68 of the second fluid seal 62 and the upstream end 46, of the fluid conduit 28, the second fluid seal restraint 72 further in pressing engagement with the external surface 60 of the fluid conduit 28. Further, as identified, or shown, in the various drawings, the first fluid seal restraint 70 differs from the first fluid seal restraint 70' by esthetic presentation only; they are functional equivalents, and as further still identified, or shown, in the various drawings, the second fluid seal restraint 72 differs from the second fluid seal restraint 72' by esthetic presentation only; they are functional equivalents. FIG. 2 still further shows that the rotary union 10, preferably includes a bearing spacer 74, disposed between the first bearing 52 and the second bearing 54 of the pair of bearings 50. The bearing spacer 74 provides stability of the first and second bearings (52, 54) during the process of pressing the pair of bearings 50 into a rotary union housing 76, of the rotary union assembly 10. As identified, or shown, in the various drawings, bearing spacer 74 differs from bearing spacer 74', or bearing spacer 74" by esthetic presentation only; they are all functional equivalents of one another. Also, as identified, or shown, in the various drawings, rotary union housing 76 differs from rotary union housing 76' by esthetic presentation only, and as further shown by the various drawings presenting the rotary union housing (76, 76'), the rotary union housing (76, 76') is a single component, and the rotary union housing (76, 76') are functional equivalents.

As discussed hereinabove, in a preferred embodiment, the second fluid seal 62, mitigates transfer of an environment contained within an interior 64, of the hubcap 32, from entry into the pair of bearings 50. However, if the environment within the hubcap 32 elevates in pressure, a spring loaded pressure relief valve 78 (such as a poppet valve), else a pressure relief seal 80 (of FIG. 9), confined by an excess pressure collection chamber 82 (which is provided by the rotary union housing 76, and is in contact adjacency with the exterior 34, of the hubcap 32, and shown by FIGS. 2 and 3), activates to relieve the pressure present in the pressure collection chamber 82, to atmosphere. That is, when the pressure contained by the pressure collection chamber 82 reaches a predetermined pressure level, which in a preferred embodiment is in the range of 5 to 8 PSI.

Figure 4:
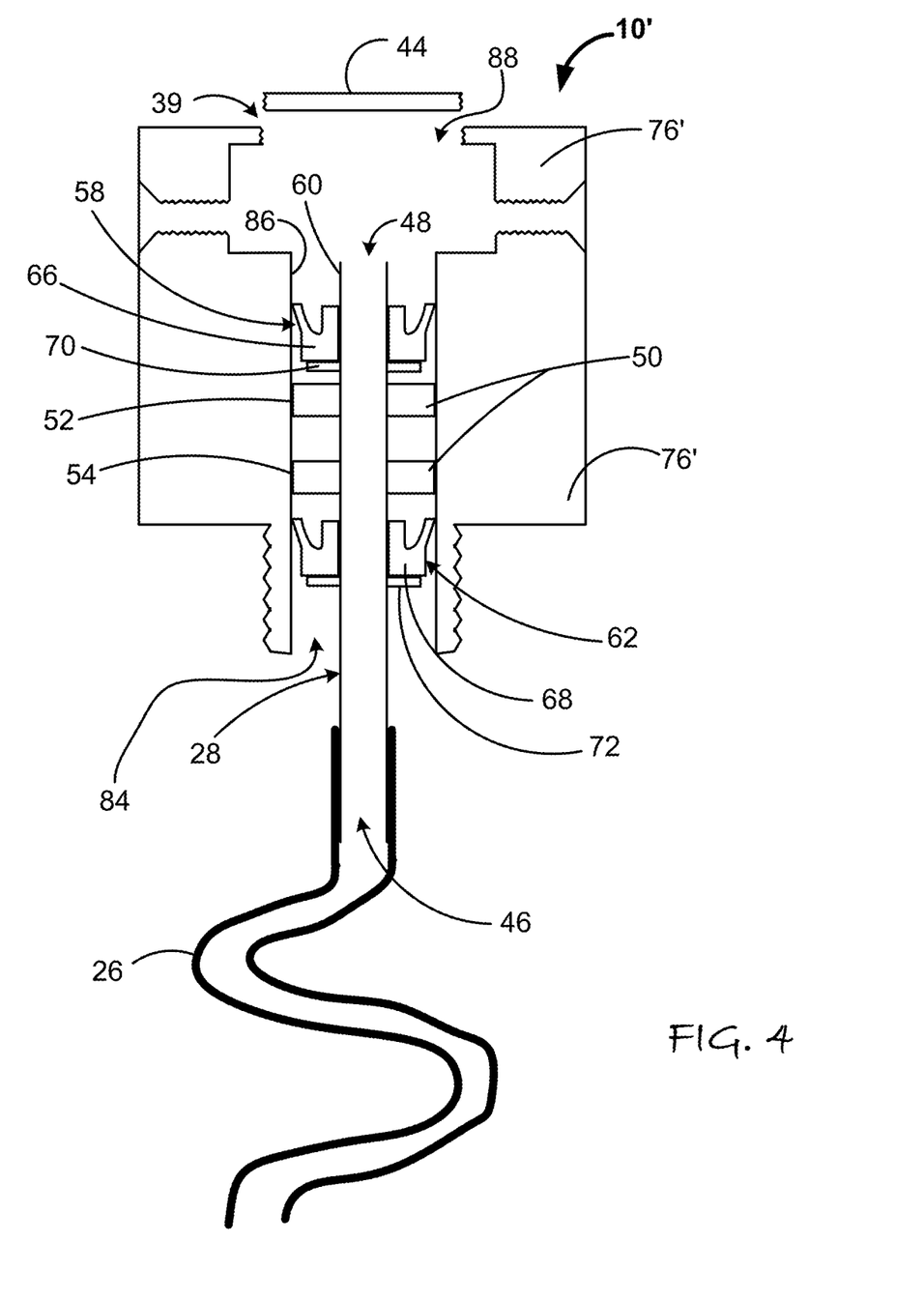
FIG. 4 is a cross-sectional side view of the rotary union housing, air lines and associated seals preferably employed by the present novel tire pressure management system.

FIG. 4 shows a preferred embodiment that preferably includes at least the rotary union housing 76' supporting and confining the fluid conduit 28, within a central bore 84 (also referred to herein as channel 84), of the rotary union housing 76'. The fluid conduit 28 preferably provides the downstream end 48 and the upstream end 46. Further shown by FIG. 4 is the pair of bearings 50; each of the pair of bearings 50 provides an inner race and an outer race. Each inner race of the pair of bearings 50, is in pressing communication with the external surface 60, of the fluid conduit 28, and each outer race of the pair of bearings 50, is in pressing communication with a bore surface 86 (also referred to herein as wall 86), of the central bore 84, of the rotary union housing 76'. The first bearing 52, of the pair of bearings 50, is adjacent the downstream end 48, of the fluid conduit 28, and the second bearing 54, of the pair of bearings 50, is adjacent the upstream end 46, of the fluid conduit 28.

FIG. 4 further shows that in a preferred embodiment, the rotary union 10' preferably includes a pair of fluid seals 56, the first fluid seal 58, of the pair of fluid seals 56, engages the external surface 60, of the fluid conduit 28, and is disposed between the first bearing 52, and the downstream end 48, of said fluid conduit 28. The second fluid seal 62, of the pair of fluid seals 56, engages the external surface 60 of the fluid conduit 28, and is disposed between said second bearing 54, and the upstream end 46, of the fluid conduit 28. In a preferred embodiment, the first fluid seal 58 provides the base portion 66, and the first fluid seal restraint 70, which is in pressing contact with the external surface 60 of the fluid conduit 28, abuts against the base portion 66, of the first fluid seal 58, to maintain the relative position of the first fluid seal 58, adjacent the bore surface 86, of the central bore 84; and the second fluid seal 62, provides the base portion 68, and the second fluid seal restraint 72, which is in pressing contact with the external surface 60 of the fluid conduit 28, abuts against the base portion 68, of the second fluid seal 62, to maintain the relative position of the second fluid seal 62, adjacent the bore surface 86, of the central bore 84. In a preferred embodiment, the rotary union housing 76' further provides a fluid distribution chamber 88 (also referred to herein as a fluid chamber 88), which is in fluid communication with the downstream end 48, of the fluid conduit 28.

The fluid chamber 88, receives pressurized air from the fluid conduit 28, and transfers the received pressurized air to the tires 12 and 14 (of FIG. 1).

Figure 5:
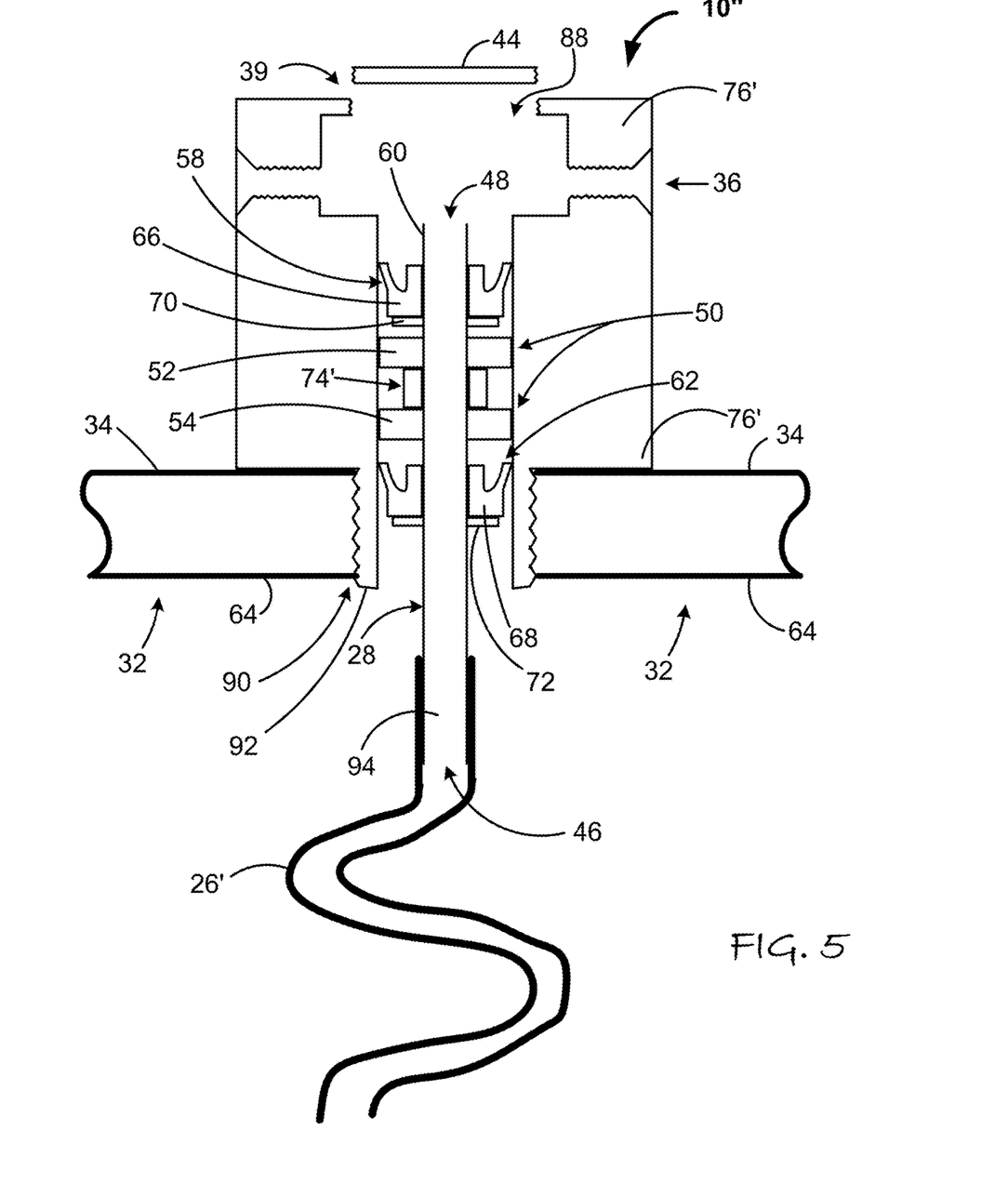
FIG. 5 is a cross-sectional side view of an alternate rotary union assembly of the present novel tire pressure management system and its associated bearings and bearing spacer.

FIG. 5 shows that in a preferred embodiment, the hubcap 32 provides an attachment aperture 90. The attachment aperture 90 is preferably disposed between the interior 64 and the exterior 34, of the hubcap 32. The attachment aperture 90 provides an axis of rotation, which is preferably substantially aligned with an axis of the axle 16 (of FIG. 1). Additionally, the rotary union housing 76' provides at least an attachment member 92, which preferably is in mating communication with the attachment aperture 90. FIG. 5 further shows that the fluid conduit 28 provides a fluid communication portion 94, which extends beyond the attachment member 92, and into the interior of said hubcap 32.

Figures 6, 7:
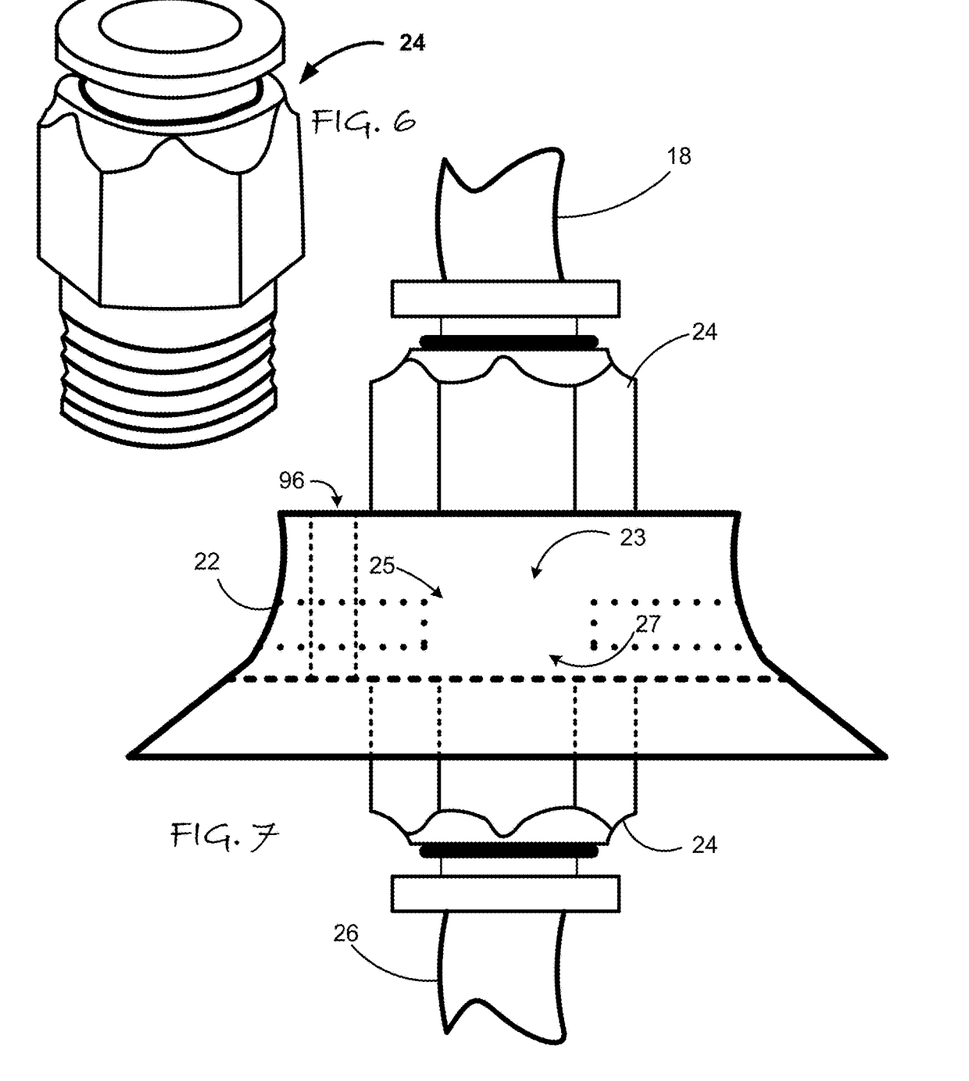
FIG. 6 is a view in perspective of a push to connect fluid fitting of the rotary union assembly of FIG. 1.
FIG. 7 is a side elevation view of a pair of push to connect fluid fittings of the present novel tire pressure management system of FIG. 1.

FIGS. 6 and 7 show the push to connect fluid fitting 24, of a preferred embodiment. The push to connect fitting, model No. 1868X4 by Eaton Weatherhead, of Maumee, Ohio is an example of a push to connect fitting of the type found useful in a preferred embodiment. FIG. 7 shows that in a preferred embodiment, two push to connect fluid fittings 24, are secured to the axle plug 22. In a preferred embodiment, one of the pair of push to connect fluid fittings 24 is in fluid communication with the air supply line 18, while the other is in fluid communication with the fill tube 26. FIG. 7 shows that in a preferred alternate embodiment, the axle plug 22, provides a pressure transfer conduit 96, which is used to disburse pressurized air, which may accumulate in the interior 64, of the hubcap 32 (both of FIG. 4), back into the axle housing 16, when the air supply line 18, is utilized to convey pressurized air to the rotary union 10 (of FIG. 2).

Figure 8:
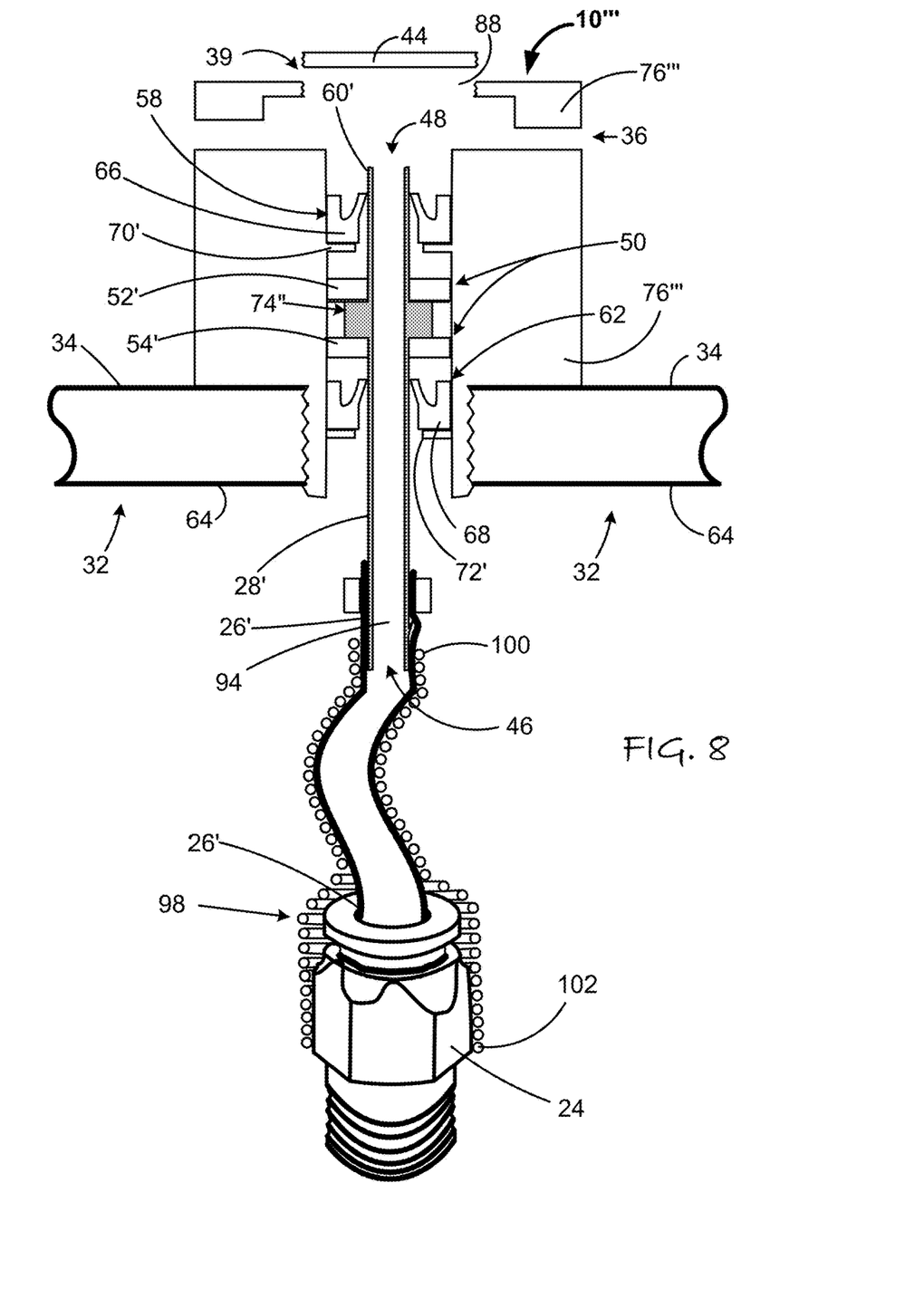
FIG. 8 is a cross-section view of the rotary union housing of an alternative rotary union assembly of the present novel tire pressure management system showing an anti-rotational means.

FIG. 8 depicts an alternate preferred embodiment of the present invention, in which the fluid conduit 28, provides the bearing spacer 74, and the rotary union housing 76''' provides the first fluid seal restraint 70. Additionally, in a preferred embodiment, the fill tube 26 is a flexible fill tube formed from a polymer, such as a polyurethane based material, else a metallic material, such as a shape memory alloy. FIG. 8 further shows that when the flexible fill tube 26 is connected to the push to connect fluid fitting 24, an anti-rotational means 98 is incorporated into the rotary union 10'''. Preferably, the anti-rotational means 98 has a first end 100, and a second end 102. The first end 100 of the anti-rotational means 98, is secured to the flexible fill tube 26, adjacent the fluid communication portion 94. The second end 102, of the anti-rotational means 98, connects to the push to connect fluid fitting 24. Preferably, the anti-rotational means 98 mitigates rotation of the fill tube 26, when the rotary union housing 76''', in conjunction with the hubcap 32, rotates about the fluid conduit 28. By example, but not by limitation, a coiled spring has been found useful as the anti-rotational means 98, in an alternate example, but not by way of limitation, a torsion bar 104 (of FIG. 9) has been found useful to serve as an anti-rotational means 98. However, as those skilled in the art will appreciate, any of a host of mechanical structures, which serve to mitigate rotation of the fill tube 26, when the rotary union housing 76''', in conjunction with the hubcap 32, rotates about the fluid conduit 28 may be employed to serve this purpose.

Figure 9:
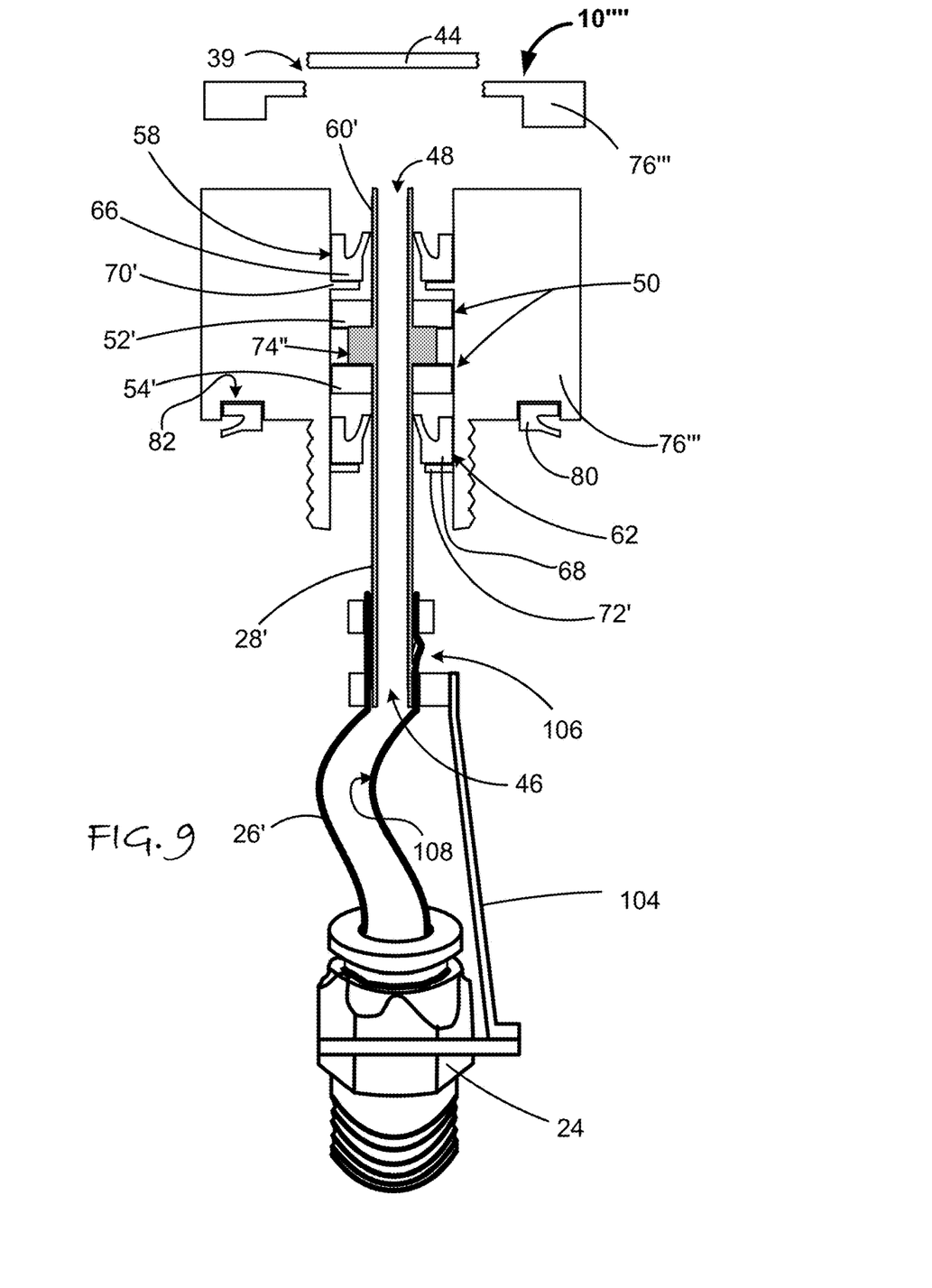
FIG. 9 is a cross-section view of the rotary union housing of the alternative rotary union assembly of FIG. 8, of the present novel tire pressure management system showing an alternate anti-rotational means.

In an alternate preferred embodiment, in addition to the fluid chamber 88, the rotary union housing 76''', further provides the air delivery channel 36, which is in fluid communication with, and extending radially from, said fluid chamber 88, as shown by FIG. 8, the fluid conduit 28, further provides a retention barb 106, protruding from the fluid conduit 28, and communicating with an interior surface 108, of said flexible fill tube 26. The retention barb 106, mitigates an inadvertent removal of said flexible fill tube 26, from the fluid conduit 28. The retention barb 106, is preferably positioned adjacent to, and downstream from the compression fitting 30, as shown by FIG. 9.

Figure 10:
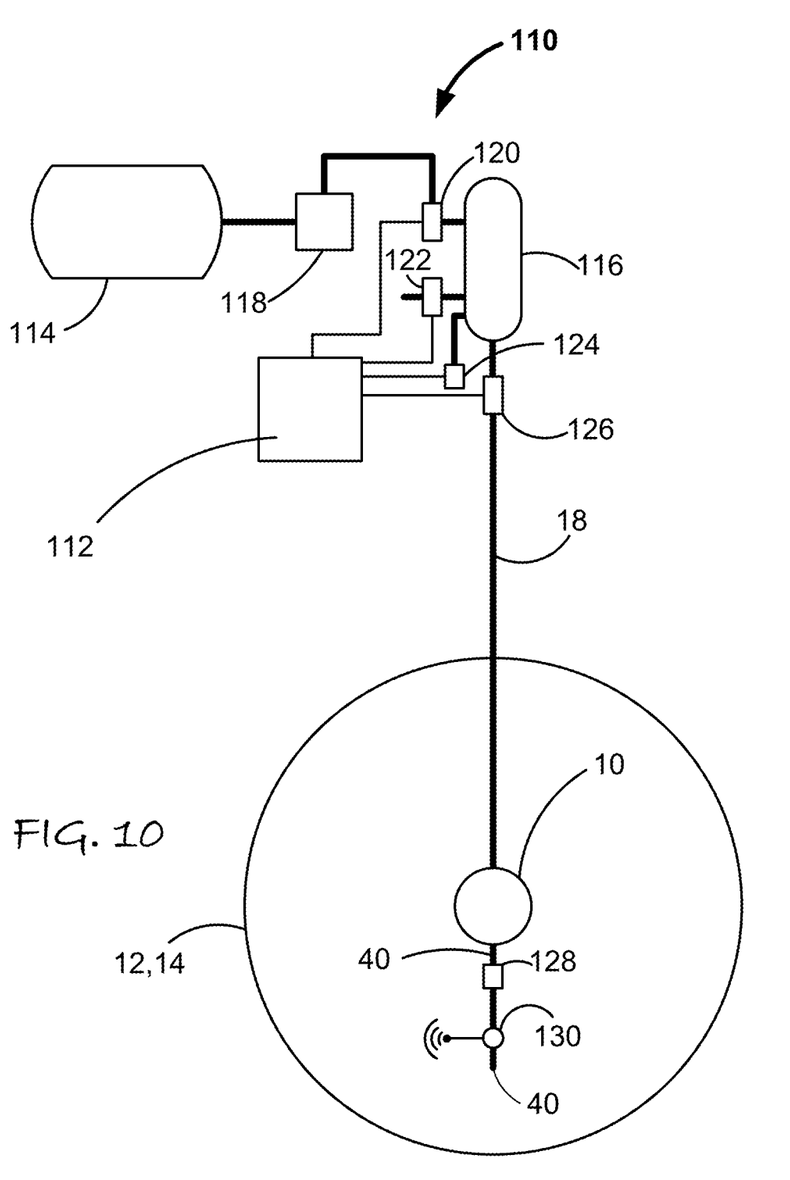
FIG. 10 is a block diagram of the present novel tire pressure management system of FIG. 1.

FIG. 10 shows a tire pressure management system 110, which preferably includes at least a fluid pressure controller 112, which in a preferred embodiment controls the flow of pressurized air into and out of the tires 12 and 14. The source of the pressurized air is a trailer air tank 114. The trailer air tank 114, is in fluidic communication with a tire pressure tank 116. The pressurized air from the trailer air tank 114 passes through an air regulator 118, and then through an air inlet control valve 120, operating under the control of the fluid pressure controller 112. In a preferred embodiment, the tire pressure management system 110, further includes at least: an air outlet valve 122, in fluid communication with the tire pressure tank 116, and under the control of the fluid pressure controller 112; a tire pressure tank pressure gauge 124, in fluid communication with the tire pressure tank 116, and in electronic communication with the fluid pressure controller 112; and an air pressure supply valve 126, in fluid communication with the tire pressure tank 116, and under the control of the fluid pressure controller 112. Preferably, the air pressure supply valve 126, supplies pressurized air to, or conversely, receives pressurized air from the air supply line 18, depending on whether the pressure in the tire (12,14), is above or below a desired pressure level.

In a preferred embodiment, pressurized air that flows into or out of the rotary union 10, is modulated by a dual flow control valve 128. Preferably, the dual flow control valve 128, responds to air pressure supplied by the air supply line 18, by opening a spring loaded valve member, which allows pressurized air to flow out of the tire (12,14), when the pressure in the tire (12,14), is greater than the air pressure in the air supply line 18. Conversely, the dual flow control valve 128, promotes the flow of pressurized air into the tire (12,14), when the pressure level within the tire 12,14 is less than the air pressure in the air supply line 18.

FIG. 10 further shows that the tire pressure management system 110, further preferably includes a tire pressure monitoring sensor 130, disposed between the dual flow control valve 128, and the tire (12,14), and in electronic communication with the fluid pressure controller 112. In a preferred embodiment, the tire pressure monitoring sensor 130, measures the level of pressure within the tire (12,14), and relays the measured pressure level to the fluid pressure controller 112. The fluid pressure controller 112, compares the measured pressure level within the tire (12,14) to a target pressure, maintains the pressure available in the tire pressure tank 116 at the target level, and directs the air pressure supply valve 126, to release pressurized air to the dual flow control valve 128, which activates to promote either inflation, or deflation of the tire (12,14), to bring the pressure level within the tire (12,14) into balance with the target pressure level. Once the desired pressure level within the tire (12,14) is achieved, as measured by the tire pressure monitoring sensor, the fluid pressure controller 112, directs the air pressure supply valve 126, to disengage.

In a preferred embodiment, the fluid pressure controller 112, operates both the air outlet valve 122, and the air inlet control valve 120, to maintain the pressure within the tire pressure tank 116, at a predetermined pressure level. For example, but not by way of limitation, if the tire pressure of the tires (12,14) is above the target pressure level, the fluid pressure controller 112, will crack open the air outlet valve 122, to allow relief of pressure from the system; and if the tire pressure of the tires (12,14) is below the target pressure level, the fluid pressure controller 112, will crack open the air inlet control valve 120, to allow pressure to build in the system.

As will be apparent to those skilled in the art, a number of modifications could be made to the preferred embodiments which would not depart from the spirit or the scope of the present invention. While the presently preferred embodiments have been described for purposes of this disclosure, numerous changes and modifications will be apparent to those skilled in the art. Insofar as these changes and modifications are within the purview of the appended claims, they are to be considered as part of the present invention.

What is claimed is:

1. A tire pressure management system comprising:
an axle housing enclosing a pressurized fluid;
a hubcap supported by the axle housing and having an interior and an exterior; and
a rotary union axially aligned with the axle housing and mounted to the hubcap from the exterior of the hubcap, the rotary union including at least:
a rotary union housing providing a central bore;
a fluid conduit, the fluid conduit having a downstream end and an upstream end, the fluid conduit supported by the rotary union housing, and the fluid conduit is a single, unitary component between the upstream end and the downstream end;
a pair of bearings, each of the pair of bearings providing an inner race and an outer race, each inner race of the pair of bearings in pressing communication with the fluid conduit, each outer race of the pair of bearings in pressing communication with a bore surface of said central bore, a first bearing of the pair of bearings adjacent the downstream end of said fluid conduit, and a second bearing of the pair of bearings adjacent the upstream end of said fluid conduit;
a pair of fluid seals, a first seal of said pair of fluid seals engaging an external surface of the fluid conduit and said bore surface of said central bore, said first seal disposed between said first bearing and said downstream end of said fluid conduit, and a second seal of said pair of fluid seals engaging said external surface of the fluid conduit and said bore surface of said central bore, said second seal disposed between said second bearing and said upstream end of said fluid conduit, wherein each first seal and second seal of said pair of fluid seals forms a rotary seal between said external surface of the fluid conduit and said bore surface of said central bore, and wherein the pair of fluid seals are lip seals, in which said upstream end of said fluid conduit provides a fluid communication portion;
a fill tube secured to said fluid communication portion; and
a push to connect fluid fitting communicating with said pressurized fluid and disposed between said fill tube and said pressurized fluid, said push to connect fluid fitting conducting said pressurized fluid housed by said axle to said fill tube.

2. The tire pressure management system of claim 1, in which the first seal provides a base portion, and further comprising a first fluid seal restraint, the first fluid seal restraint in contact adjacency with the base portion of the first seal.

3. The tire pressure management system of claim 2, in which the second seal provides a base portion, and further comprising a second fluid seal restraint, the second fluid seal restraint in contact adjacency with the base portion of the second seal.

4. The tire pressure management system of claim 3, in which said rotary union housing further includes at least a fluid distribution chamber in fluidic communication with said central bore.

5. The tire pressure management system of claim 4, in which said hubcap provides an attachment aperture, said attachment aperture disposed between said interior and said exterior of said hubcap, said attachment aperture providing an axis of rotation, said axis of rotation substantially aligned with an axis of said axle.

6. The tire pressure management system of claim 5, in which said rotary union housing further provides at least an attachment member, said attachment member in mating communication with said attachment aperture.

7. The tire pressure management system of claim 6, wherein said fluid communication portion extends beyond said attachment member and into said interior of said hubcap.

8. The tire pressure management system of claim 7, in which said fluid conduit provides an exterior surface, wherein said each inner race of each bearing of the pair of bearings is in pressing communication with said exterior surface of said fluid conduit, and said fluid conduit has a circular cross-sectional shape.

9. The tire pressure management system of claim 8, wherein said fill tube further in fluidic communication with said pressurized fluid.

10. The tire pressure management system of claim 1 in which said fill tube is a flexible fill tube, said flexible fill tube formed from a polymer.

11. The tire pressure management system of claim 10, in which said polymer of said flexible fill tube is a polyurethane based material.

12. The tire pressure management system of claim 1, in which said fill tube is a flexible fill tube, said flexible fill tube formed from a metallic material.

13. The tire pressure management system of claim 12, in which said metallic material of said flexible tube is a shape memory alloy.

14. The tire pressure management system of claim 1, in which said fill tube is a flexible fill tube, and further comprising an anti-rotational means having a first end and a second end, said first end of said anti-rotational means secured to said fill tube and adjacent said fluid communication portion, said second end communicating with said push to connect fluid fitting.

15. The tire pressure management system of claim 14, in which said rotary union housing rotates in conjunction with said hubcap around said fluid conduit, and said anti-rotational means mitigates rotation of said fluid conduit while said rotary union housing rotates about said fluid conduit.

16. The tire pressure management system of claim 15, further comprising a tire supported by said axle housing, and in which the rotary union housing further comprising:
    said fluid distribution chamber in fluidic communication with said fluid conduit;
    an air delivery channel in fluid communication with, and extending radially from, said fluid distribution chamber;
    a tire pressure hose in fluid communication with and disposed between said tire and said air delivery channel;
    a seal access aperture adjacent said fluid distribution chamber; and
    a removable seal access cover communicating with said seal access aperture, said removable seal access cover mitigating escapement of said pressurized fluid from said tire pressure hoses, said air delivery channel, and said fluid distribution chamber.

17. The tire pressure management system of claim 16, further comprising:
    a bearing spacer disposed between said first bearing and second bearing of said pair of bearings;
    an excess pressure collection chamber formed on an exterior of said rotary union housing and adjacent the exterior of said hubcap;
    a retention barb protruding from the fluid conduit and communicating with an interior surface of said flexible fill tube, said retention barb mitigates an inadvertent removal of said flexible fill tube from said fluid conduit; and
    a compression fitting communicating with said exterior of said flexible fill tube, said compression fitting compressibly securing said flexible fill tube to said fluid conduit adjacent said upstream end of said fluid conduit.

18. The tire pressure management system of claim 17, further comprising a pressure relief seal confined by said excess pressure collection chamber and in contact adjacency with said exterior of said hubcap, said pressure relief seal releasing fluid from said pressure collection chamber to atmosphere when a pressure of said fluid contained by said pressure collection chamber reaches a predetermined pressure level, and in which said bearing spacer is provided by said fluid conduit, and said first fluid seal restraint is provided by said rotary union housing.

19. The tire pressure management system of claim 18, in which the push to connect fluid fitting is a first push to connect fluid fitting, and further comprising:
    an axle plug affixed to said axle, said axle plug providing a push to connect fluid fitting mounting aperture, said push to connect fluid fitting mounting aperture having at least an upstream portion and a downstream portion, said first push to connect fluid fitting secured to said downstream portion of said push to connect fluid fitting mounting aperture;
    a second push to connect fluid fitting directly opposed to said first push to connect fluid fitting, said second push to connect fluid fitting secured to said upstream portion of said push to connect fluid fitting mounting aperture; and
    an air supply line housed by said axle, said air supply line in fluid communication with said second push to connect fluid fitting, said second push to connect fluid fitting in fluid communication with said first push to connect fluid fitting, said first push to connect fluid fitting in fluid communication with said fill tube, said fill tube in fluid communication with said fluid conduit, said fluid conduit in fluid communication with said fluid chamber, said fluid chamber in fluid communication with said air delivery channel, said air delivery channel in fluid communication with said tire pressure hose, said tire pressure hose in fluid communication with said tire.

20. The tire pressure management system of claim 19, further comprising a fluid pressure controller in fluidic communication with said air supply line, said fluid pressure controller maintains a predetermined pressure within said tire, said fluid pressure controller supplies additional fluid to said tire when a first pressure within said tire falls below said predetermined pressure within said tire, else said fluid pressure controller extracts fluid from said tire when a second pressure within said tire rises above said predetermined pressure within said tire.

21. The tire pressure management system of claim 17, further comprising a spring loaded pressure relief valve communicating with said excess pressure collection chamber and adjacent said exterior of said hubcap, said spring loaded pressure relief valve releasing fluid from said pressure collection chamber to atmosphere when a pressure of said fluid contained by said pressure collection chamber reaches a predetermined pressure level, and in which said bearing spacer is provided by said fluid conduit, and said first fluid seal restraint is provided by said rotary union housing.

22. The tire pressure management system of claim 17, in which said spring loaded pressure relief valve is a poppet valve.

\* \* \* \* \*